March 8, 1960     A. M. COMPTON     2,927,756
UNIVERSAL TANK MOUNTING DEVICE
Filed Sept. 8, 1958     2 Sheets-Sheet 1
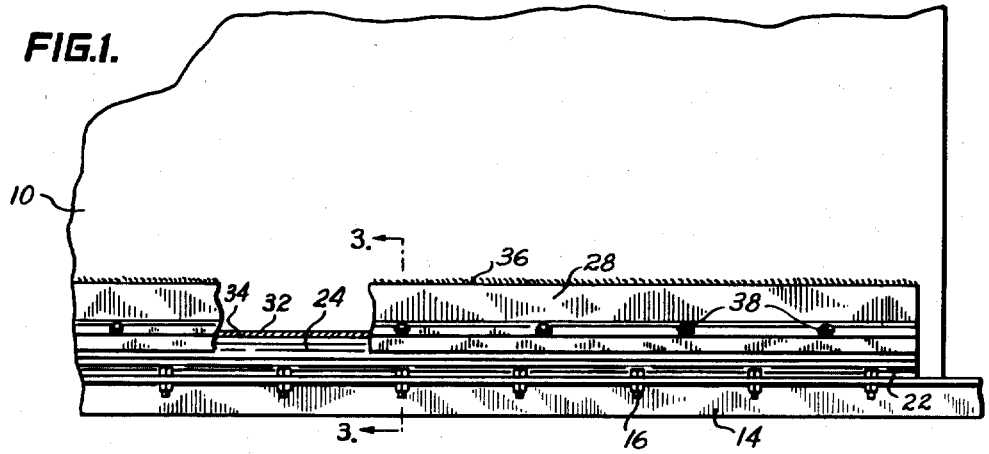
FIG.1.
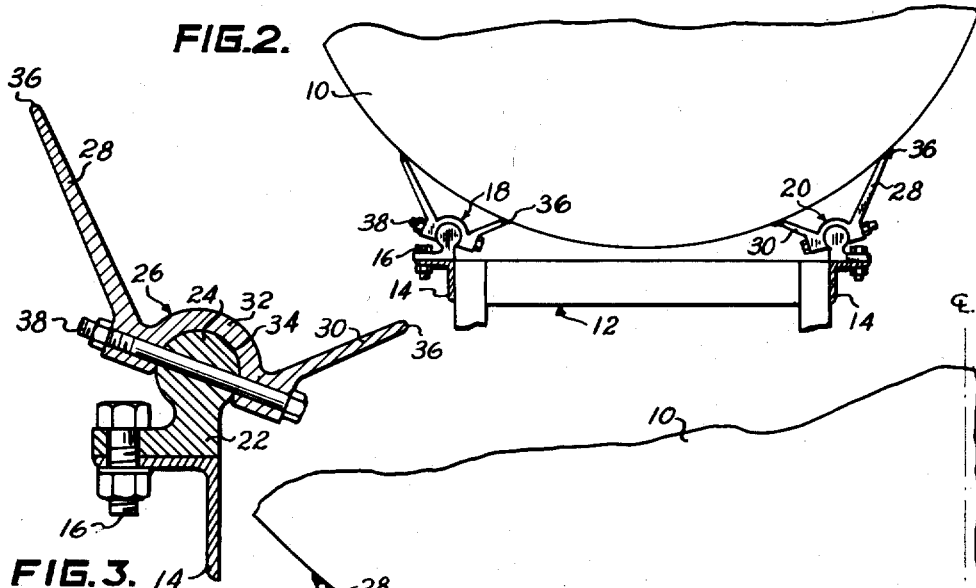
FIG.2.
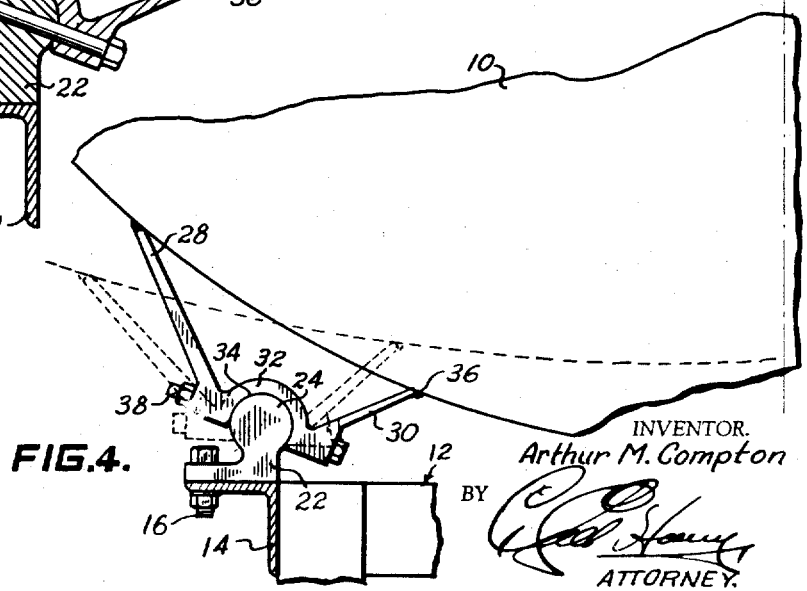
FIG.3.
FIG.4.
INVENTOR.
Arthur M. Compton
BY
ATTORNEY.

March 8, 1960
A. M. COMPTON
2,927,756
UNIVERSAL TANK MOUNTING DEVICE
Filed Sept. 8, 1958
2 Sheets-Sheet 2
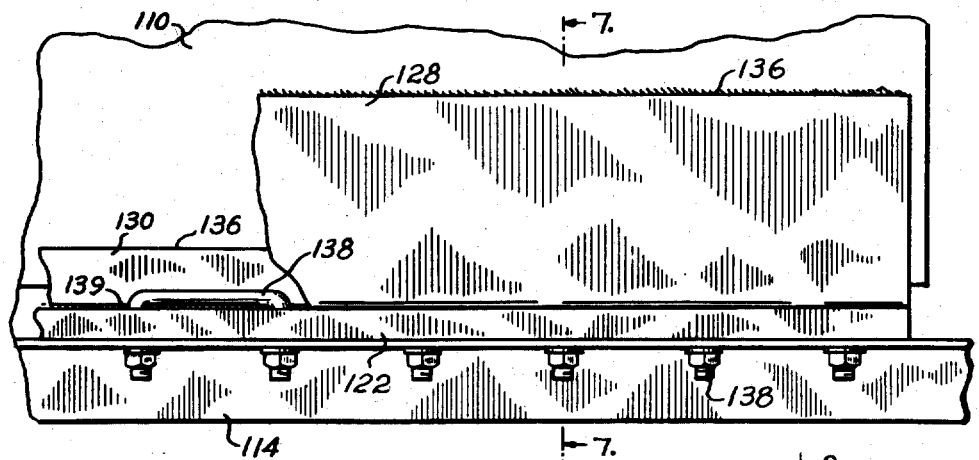
FIG.5.
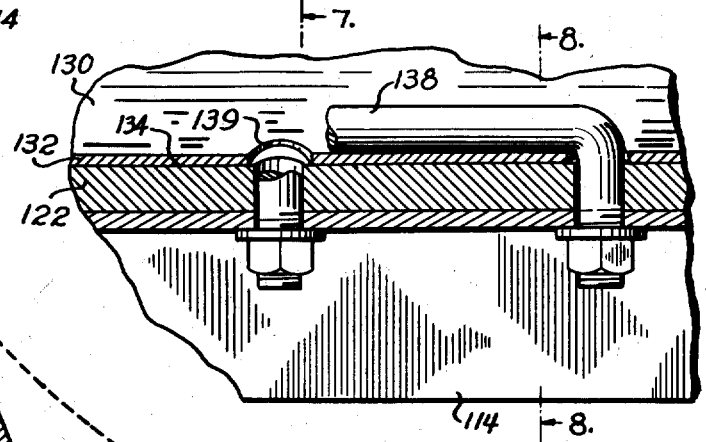
FIG.6.
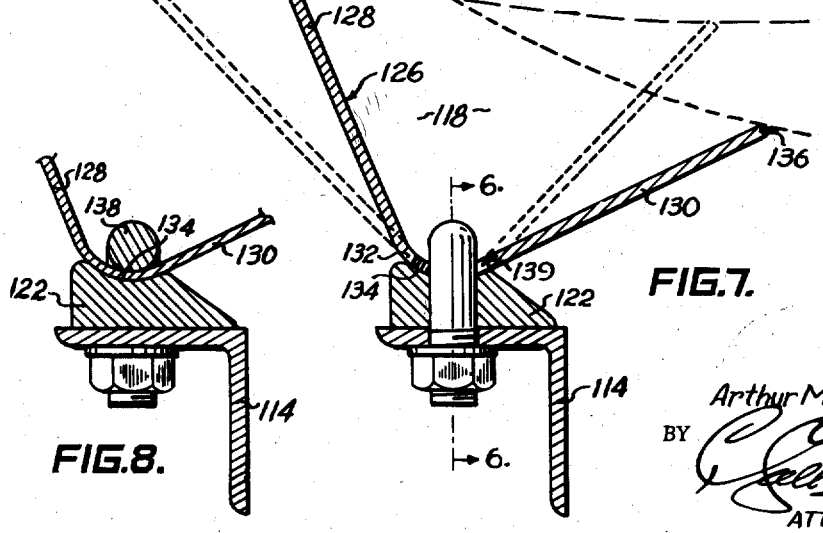
FIG.7.
FIG.8.
INVENTOR.
Arthur M. Compton
BY
ATTORNEY.

United States Patent Office 2,927,756
Patented Mar. 8, 1960

2,927,756
UNIVERSAL TANK MOUNTING DEVICE

Arthur M. Compton, Bethel, Kans., assignor to Standard Steel Works, Inc., North Kansas City, Mo., a corporation of Texas Application September 8, 1958, Serial No. 759,688

7 Claims. (Cl. 248—146)

This invention relates to improvements in transport tanks and more particularly, in a tank mount having as an important feature thereof the universal adaptation to tanks of various dimensions and external configurations.

In the manufacture of road equipment of the kind employing a horizontal tank for the shipment of liquids and the like such as petroleum, chemicals, milk and other food products through use of trucks and trailers, specifications vary widely insofar as the size and shape of the tank is concerned. This presents a problem to the manufacturer in the mount or support for the tank because of the fact that the same must be designed and built specially, depending upon the requests of the customers.

It is the most important object of the present invention, therefore, to provide a mount or support that is adjustable, or more desirably, self-conforming to the shape and size of the tank which it supports.

More specifically, the invention contemplates a cradle construction consisting of a pair of identical supports, each of which is in turn provided with a saddle within which the tank is confined, and the provision additionally of a rocking movement in the saddle devices such as to cause fingers or wings thereof to move into line contact with the tank at the zones of attachment thereto.

In the drawings:

Fig. 1 is a fragmentary, side elevational view of a tank showing one form of universal mounting made pursuant to the present invention, parts being broken away and in section to reveal details of construction.

Fig. 2 is a fragmentary end view of the tank illustrating the mounting device of Fig. 1, certain parts being in section.

Fig. 3 is an enlarged, vertical, cross-sectional view through one of the supports of the mount shown in Figs. 1 and 2 and taken on line 3—3 of Fig. 1.

Fig. 4 is an enlarged view similar to Fig. 2, showing but one of the supports and illustrating by dotted lines the adaptation thereof to tanks of differing external dimensions or configurations.

Fig. 5 is a view similar to Fig. 1 illustrating a modified form of mount.

Fig. 6 is an enlarged, fragmentary, cross-sectional view taken on line 6—6 of Fig. 7.

Fig. 7 is an enlarged, cross-sectional view taken on line 7—7 of Fig. 5; and

Fig. 8 is a fragmentary, cross-sectional view taken on line 8—8 of Fig. 6.

As above indicated, the instant invention is particularly adapted for use in supporting elongated, horizontal tanks 10 as shown in Figs. 1, 2 and 4 mounted on a truck or trailer (not shown) through use of chassis means shown only fragmentarily and designated broadly by the numeral 12, the chassis 12 being in turn supported by undercarriages, fifth wheels and the like, not illustrated.

Horizontal, longitudinally extending beams or sills 14, ordinarily form a part of the chassis frame-work 12 and it is to beams 14—14 that the mount of Figs. 1 to 4 inclusive is directly attached through use of suitable fasteners 16 or otherwise. Such mounting is in the nature of a cradle having a pair of spaced, horizontal supports 18 and 20 and since the same are identical, but one will be described.

It consists of a member 22 that is made rigid by virtue of its attachment to the corresponding sill 14 by the aforementioned fasteners 16. The rigid member 22 is essentially L-shaped in transverse cross-section as seen in Fig. 3, the upstanding leg whereof is provided with a transversely circular rib or hinge pin 24 that may be tubular if desired.

Each support includes additionally, a trough or upwardly facing channel device 26 provided with wings or fingers 28 and 30 that are rigidly interconnected by an integral bight portion 32 shaped to present a socket 34 for receiving the hinge pin 24 to the end that the device 26 is rockable on the member 22. It is to be noted that the wings 28 and 30 converge as the bight portion 32 is approached, and desirably, the wing 28 extends a greater distance from the bight 32 than does the wing 30. In any event, each of the wings 28 and 30 terminate in outermost, free terminal edges 36 which directly contact the outer face of the tank 10 as seen in Figs. 2 and 4.

In the illustrated embodiment of the form of my invention shown in Figs. 1 to 4 inclusive, both supports 18 and 20 extend substantially the full length of the tank 10; therefore, all four edges 36 are in line contact with the outer face of the tank 10 throughout a substantial distance and it is contemplated that such edges 36 will be attached directly to the tank 10 as by welding. It is to be understood however, that the continuity of the parts 22 and 26 of the supports 18 and 20 in an uninterrupted manner as illustrated, is not critical and that the concepts of the instant invention may be carried out equally well if either or both of the parts 22 and 26 are interrupted or consist of a number of horizontally spaced, separate parts. For example, the member 22 may well be continuous as shown, and receive a plurality of devices 26 that are relatively short and extend along the tank 10 in spaced relationship to each other. Conversely, the relatively great length of the device 26 may be maintained and the same supported by but a few of relatively short members 22. The advisability of varying the construction becomes clear when it is realized that in some instances, as for example in a semi-trailer, the tank may need support only and primarily, at the rear undercarriage and at the fifth wheel.

In any event, it is now seen, particularly by viewing Fig. 4, that the vertical swinging of the two devices 26 about the horizontal axis of the tubular rib or hinge pin 24 as the distance between the two members 22 remains unchanged, permits the two devices 26 to properly seat or saddle the tank 10 regardless of its outermost circumference and irrespective of whether or not the tank is circular, elliptical, or some other desired configuration.

After the edges 36 are spot-welded or otherwise firmly attached to the tank 10, the ribs 24 are inserted into the sockets 34 and attached to the sills 14. While the two saddle devices 26 can then no longer rotate with respect to their supporting members 22, the attachment to the tank 10 at the edges 36 will not likely break loose if the two parts 22 and 26 are thereupon drilled and firmly interconnected by one or more bolts 38 provided for the devices 26 adjacent the wings 28 where the same are readily accessible and disposed in intersecting relationship to the pin or rib 24, as is clear in Fig. 3.

The form of my invention just above described lends itself to manufacture by extrusion from relatively lightweight, yet strong material such as aluminum. In the event, however, that it is desired to carry out the same principles through use of sheet metal formed to the necessary shape, resort may be had to the embodiment illustrated by Figs. 5 to 8.

In this modification, there is again provided a cradle having a pair of spaced supports, only one of which is illustrated and designated by the numeral 118. It includes a rigid member 122 in the nature of a bar that lies flatly upon sill 114 and a rockable device 126 that is again substantially V-shaped in transverse cross section, presenting a short finger or wing 130 and a longer wing or finger 128. The sheet material from which the device 126 is made may be bent into the shape illustrated, presenting a bight 132 toward which the wings 128 and 130 converge, such bight 132 being provided with a convex, outermost face that rests within a convex seat or socket 134 in the uppermost face of the bar member 122.

Common means is provided for interconnecting the parts 122 and 126 and for rigidly securing the bar 122 to the sill 114. Such means includes a plurality of U-bolts 138 having the bights thereof confined within the channel or trough that is presented by the device 126. The legs of the bolts 138 pass through openings 139 in the bights 132 and thence through the bar 122, as well as the sill 114.

To the end that wings 128 and 130 may be swung vertically so as to accommodate differing types of tanks as illustrated in Fig. 7, the openings 139 for clearing the legs of the bolts 138 are in the nature of elongated slots, and it is seen also that as the devices 126 swing or rock so as to be self-conforming to tank 110, the bights 132 slide smoothly within the arcuate seats 134 whereupon, after attaching edges 136 of wings 128 and 130 to the tank 110, bolts 138 are drawn tight.

Here again, if, in the interest of savings in material, expense, weight, or for other reasons, it is desired to vary the continuity of the parts 122 and 126, it is preferable to maintain the line contact of the edges 136 with the tank 110 throughout its length and to utilize bar members 122 of short expanse, for example, only at such points where the fastening means 138 are needed.

Having thus described the invention what is claimed as new and desired to be secured by Letters Patent is:

1. A mount for a horizontal tank comprising a cradle having a pair of spaced supports each including a rigid member and a device rockable on the member and provided with fingers engageable with the tank.

2. A mount for a horizontal tank comprising a cradle having a pair of spaced supports each including a rigid member and a device rockable on the member and provided with a pair of spaced, rigidly interconnected fingers engageable with the tank.

3. In combination with a horizontal tank, a mount beneath the tank comprising a cradle having a pair of spaced, elongated supports substantially coextensive in length with the tank and each including a rigid member and a saddle vertically swingable on the member and provided with a pair of spaced, rigidly interconnected fingers attached to the tank.

4. In combination with a horizontal tank, a mount beneath the tank comprising a cradle having a pair of spaced, elongated supports substantially coextensive in length with the tank and each including a rigid member and a saddle vertically swingable on the member, each saddle being trough-shaped, presenting a pair of spaced, rigidly interconnected fingers in line contact with the tank and attached thereto.

5. In combination with a horizontal tank, a mount beneath the tank, comprising a horizontal cradle having a pair of horizontally spaced supports each including a rigid member and a channel-shaped, upwardly facing saddle on the member provided with spaced, rigidly interconnected wings having outermost edges substantially coextensive in length with the tank, in line contact therewith, and attached thereto.

6. The invention of claim 5, there being a pin and socket hinge connection between each support and its saddle for vertical rocking movement of the latter.

7. The invention of claim 5, the supports being provided with seats receiving the saddles for vertical rocking movement; and means clamping the saddles in the seats.

References Cited in the file of this patent

UNITED STATES PATENTS

| | | |
|---|---|---|
| 396,372 | Schreieber | Jan. 15, 1889 |
| 2,870,982 | Greene | Jan. 27, 1959 |